United States Patent [19]

Kendall et al.

[11] 4,165,532
[45] Aug. 21, 1979

[54] AUTOMATIC IRRIGATION SPRINKLER SYSTEM CONTROLLER

[75] Inventors: Thomas L. Kendall, Big Bear Lake; Leo G. Downing, Riverside; James A. Ray, Calimesa, all of Calif.

[73] Assignee: The Toro Company, Minneapolis, Minn.

[21] Appl. No.: 866,049

[22] Filed: Dec. 30, 1977

[51] Int. Cl.² .................. G06F 15/56; A01G 25/16
[52] U.S. Cl. .................. 364/420; 137/624.2; 239/70; 307/141.4; 364/104; 364/120; 364/510
[58] Field of Search .............. 364/420, 104, 120, 100, 364/103, 107, 479, 509, 510, 200 MS File, 900 MS File; 137/624.11, 624.12, 624.13, 624.16, 624.18, 624.19, 624.2; 239/69, 70; 340/309.1, 309.3, 309.4, 310 R, 150, 151, 166 R; 307/141, 141.4, 141.8, 41

[56] References Cited

U.S. PATENT DOCUMENTS

| | | | |
|---|---|---|---|
| 3,599,867 | 8/1971 | Griswold et al. | 239/70 X |
| 3,723,753 | 3/1973 | Davis | 307/41 |
| 3,869,854 | 3/1975 | Church | 137/624.2 X |
| 3,975,622 | 8/1976 | Horn et al. | 364/120 X |
| 4,006,464 | 2/1977 | Landell | 364/120 X |
| 4,007,458 | 2/1977 | Hollabaugh | 340/310 R |
| 4,015,366 | 4/1977 | Hall | 239/69 X |

Primary Examiner—Joseph F. Ruggiero
Attorney, Agent, or Firm—Poms, Smith, Lande & Rose

[57] ABSTRACT

A solid state controller for an automatic irrigation sprinkler system is disclosed. Irrigation information is maintained in and acted upon by solid state logic and control circuit means. Initialization and re-parameterization of the irrigation information is accomplished with a keyboard input in conjunction with an alphanumeric display system indicating time of day, day of week, station number, run time associated with each station, and program type associated with each day of the week. A dual power supply is included being run normally from a commercial AC source to provide the proper voltage levels for both the logic and control circuitry and the sprinkler system station valves. Additionally, battery backup is provided. In the event of loss of AC power, the controller uses the battery to maintain only the real-time clock, turning off all other functions to conserve energy. Upon the resumption of AC power, normal operation is continued without loss of time continuity. The solid state controller disclosed contains features not possible with prior art mechanical type controllers.

14 Claims, 10 Drawing Figures

(f)

(g)

(h)

AUTOMATIC IRRIGATION SPRINKLER SYSTEM CONTROLLER

BACKGROUND OF THE INVENTION

The present invention relates to automatic irrigation sprinkler systems and more particularly to controllers having timekeeping capability for starting and stopping the stations of the sprinkler system on a periodic basis.

Watering of large areas such as golf courses, parks, and the like is a complicated matter. Typically, it is accomplished by automatic equipment. Such automatic irrigation sprinkler systems have a plurality of sprinkler stations strategically located throughout the area to be irrigated. Each sprinkler station contains a valve for controlling the flow of water entering the station from a source of pressurized water and exiting the station to a sprinkler line terminating in a plurality of sprinkler heads located at preselected locations so as to water the lawns, trees, and shrubbery in a thorough manner. The various sprinkler stations are electrically connected back to a common controller. The water required by lawns, trees, and shrubbery differs. The amount of watering required to maintain a lawn may, in fact, be detrimental to certain trees and shrubs. Thus, it is usual to operate the sprinklers associated with lawn areas from one sprinkler station and those associated with shrubberies and trees from a separate and distinct station. The controller to which the sprinkler stations are all ultimately connected is a clock operated device with the capability of keeping track of both the hours of the day and the day of the week. The clock mechanisms contained therein operate switches which open and close the circuits to the various sprinkler stations so as to accomplish the irrigation of the area in an optimum manner.

In prior art irrigation sprinkler system controllers, these functions have been accomplished in a mechanical manner. That is, mechanical clock mechanisms drive one or more controller wheels having pins, cams, etc. mounted thereon which operate the sprinkler station switches. The controller wheels of such apparatus are typically marked with the parameter being controlled such as the time of day or day of the week. The activation pins, cams, etc. are movable by the operator so as to "program" the controller to operate in the desired manner.

With only a few sprinkler stations to be controlled and under steady conditions, such apparatus is fairly workable for its intended purpose. As the number of stations to be controlled becomes large, such as in the irrigation of golf courses and other large areas, mechanical controllers can become quite large. As with all mechanical devices, there is, of course, always the consideration of mechanical failures due to contact corrosion and limited duty cycles, as well as inoperation or changing of operating times or the like due to the movement of mechanical parts. More important, however, conditions for the optimum irrigation of large areas over extended periods of time are never static. Unseasonable weather, a sudden shower or drought condition, and many other factors can dictate changes in the irrigation schedule as being desirable. In complex multi-station mechanical controllers, such spontaneous reprogramming is often a difficult task. Difficult at least to the point of operators often bypassing a desirable slight modification of the sprinkling schedule as opposed to accomplishing it with mechanical means. For example, cancelling the balance of an irrigation day or requesting an additional watering period for one or more sprinkler stations is not a trivial task with the typical mechanical controller. Moreover, in the event of a power loss for a period of time, the clocks in such apparatus will become disoriented vis a vis real-time so that the sprinkling sequence will no longer be as desired. In such locations as golf courses, parks, etc. where public interface is an expected part of the daily routine, sprinkler operation must be accomplished at times and in locations so as to have minimal impact. In the event that the sprinkler sequence is modified due to a power failure, the sprinklers may end up in undesirable operation simultaneously with a time of maximum public usage of the facility.

Wherefore, it is the object of the present invention to provide a solid state controller for automatic irrigation sprinkler systems which is compact, easily reprogramable for both extended and one time operation and which includes a battery backup system for maintaining the real-time clock in synchronization with real time even in the event of main controller power failure.

SUMMARY

The foregoing objectives have been accomplished by the present invention which comprises power supply means adapted to be connected to a source of AC power for providing a first voltage output pair for operating logic and display circuitry and a second voltage output pair for operating a sprinkler system valve; at least one solid state switch having a power input, a power output and a control input, the power input being connected to one of the second voltage output pair; at least one voltage isolator means having an input and an output for passing a signal, the output being connected to the control input of the at least one solid state switch; and solid state control means having a power input connected to the first voltage output pair and a control signal output connected to the input of the at least one voltage isolator means for maintaining a real-time clock and outputting control signals at the control signal output at pre-selected times for pre-selected durations whereby a sprinkler system valve can be connected between the power output and the other of the second voltage output pair and be controlled by the at least one solid state switch in response to signals at the control input thereof.

More particularly, according to the preferred embodiment disclosed, the solid state controller apparatus comprises solid state logic and control means including means for storing irrigation information having a data input and a control signal output for generating control signals identified with particular sprinkler stations as a function of the irrigation information; data input means connected to the data input for allowing an operator to input irrigation information and override signals to the solid state logic and control means; and signal decoding and station power means having an input connected to the control signal output and a plurality of outputs to which individual sprinkler stations can be connected for receiving the sprinkler identified control signals and outputting a voltage at the output to which the sprinkler station is connected whereby the sprinkler station is turned on in response to an associated control signal from the logic and control means.

DESCRIPTION OF THE PREFERRED EMBODIMENT

Figure 1:
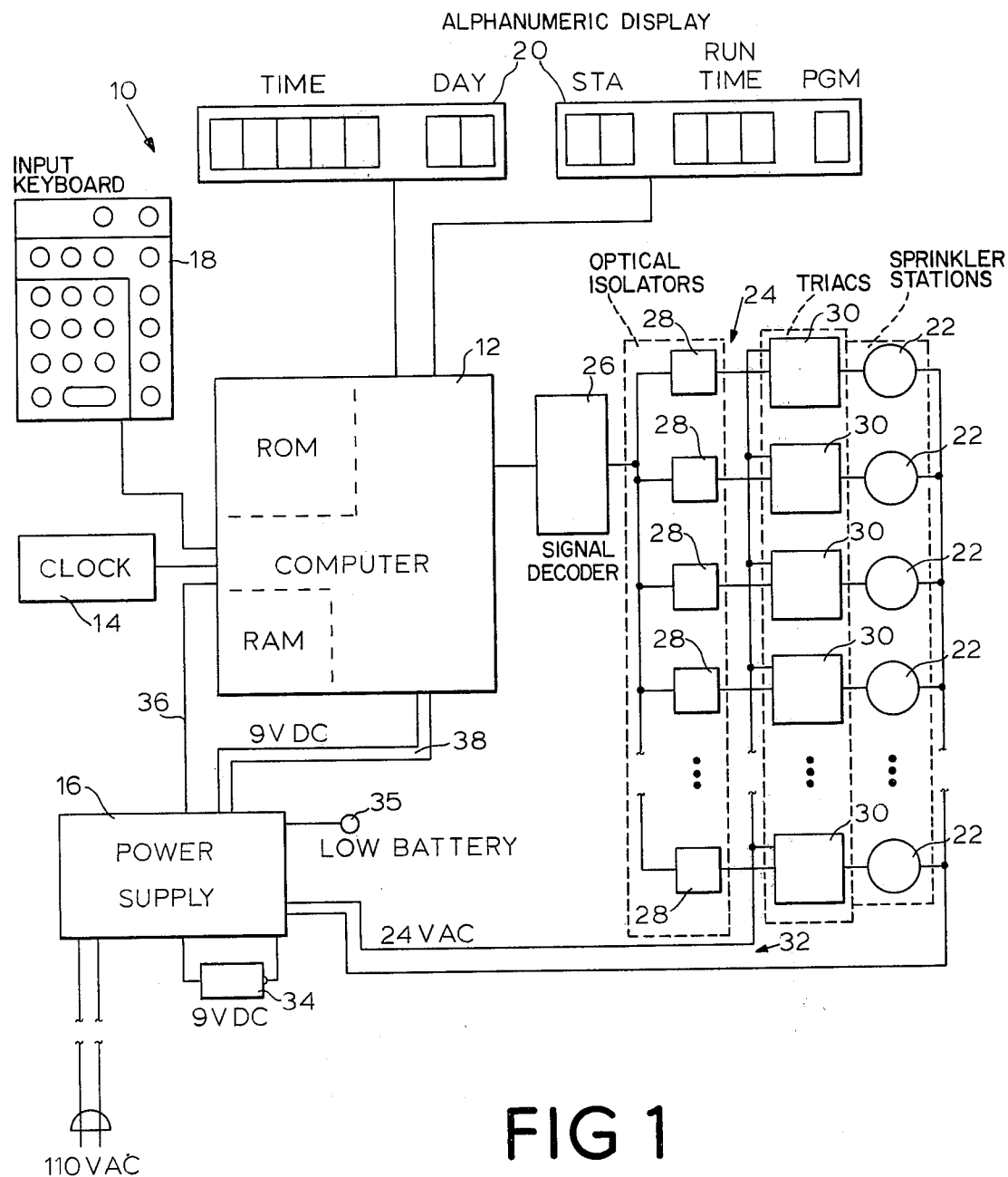
FIG. 1 is a block diagram of the automated irrigation sprinkler system control apparatus of the present invention.

Referring first to FIG. 1, the controller of the present invention is indicated generally as 10. The heart of the system is a solid state logic and control means 12. In the preferred embodiment as tested, logic and control means 12 comprises a single chip available from National Semiconductor, Inc. originally designed for incorporation in contemporary miniature solid state calculator apparatus. Such a chip offers the advantage of including both read only memory (ROM) for the stored logic sequence and a random access memory (RAM) for storing the volatile system and irrigation information data. Standard solid state clock circuitry 14 connected to logic and control means 12 provides the necessary clock logic for the system. Power of 9 volts DC for all the solid state logic and control circuitry is provided by a power connection 38 to a power supply 16. Power supply 16 is adapted to be connected to a commercial supply of power such as 110 volts AC. In addition to supplying the first voltage output 38 of 9 volts DC, power supply 16 also supplies a second voltage output 32 of 24 volts AC used to operate the sprinkler stations in a manner to be described in greater detail hereinafter. System parameterization of the irrigation information necessary for operation is provided by using an input keyboard 18 connected to logic and control means 12. In the preferred embodiment as shown, ease of system use is provided by the provision of an alphanumeric display 20 also connected to logic and control means 12 and driven thereby to indicate such parameters as time of day, day of week, station number, run time associated with an indicated station and program type associated with a particular day. To operate the sprinkler system, a plurality of sprinkler stations 22 are each connected to an output of signal decoding and station power means generally indicated as 24 connected to logic and control means 12 and adapted to receive sprinkler identified control signals from the logic and control means 12 and generate output voltages to specific sprinkler stations 22 in response thereto.

In particular, control signals from logic and control means 12 are input to a signal decoder 26. The output of signal decoder 26 is connected to the inputs of a plurality of optical isolators 28. The outputs of respective ones of optical isolators 28 are connected to the control inputs of respective ones of a plurality of TRIACs 30. Respective ones of TRIACs 30 are connected in series with respective ones of sprinkler stations 22 in parallel with the second voltage output pair 32 of power supply 16. In this manner, a 9 volt DC control signal from logic and control means 12 associated with a particular sprinkler station 22 is sent to signal decoder 26 from whence a 9 volt DC signal is output by signal decoder 26 to the particular optical isolator 28 associated with the specific sprinkler station 22. The 9 volt DC signal at the input of the optical isolator 28 causes light to be generated by a light emitting diode (LED) contained therein which, in turn, causes a DC voltage output from the photo diode contained therein which appears at the output of optical isolator 28 and, therefore, at the control input of the TRIAC 30 connected thereto. When the DC voltage appears at the control input of the TRIAC 30 associated with the specific sprinkler station 22 of interest, the voltage path to the sprinkler station 22 across the 24 volt AC output pair 32 is completed and the sprinkler station 22 is activated.

In addition to the 110 volts AC input to power supply 16, a 9 volt aklaline type battery 34 is also connected thereto. A sensing line 36 is connected between power supply 16 and logic and control means 12. Logic and control means 12 and the power supply means 16 include means adapted to sense and respond to the presence or absence of power on the 110 volt AC input line to power supply 16. When the 110 volt AC line is connected, logic and control means 12 is adapted to perform all its control and display functions. When sensing line 36 indicates that the 110 volt AC power is disconnected, however, logic and control means 12 recognizes that the first voltage output pair 38 supplying its 9 volts DC is being supplied by battery 34. At such times, logic and control means 12 is adapted to maintain only hour, minute, day etc. timing data in conjunction with clock circuitry 14. All outputs to signal decoder 26 and display 20 are stopped to conserve power until such time as the primary voltage supply of 110 volts AC is reconnected. In this manner, continuity of the real-time clock function can be maintained for extended periods of primary power outage such that controller 10 remains in synchronization with real-time to resume normal operation upon the reestablishment of primary power. The battery sensing means within power supply 16 is also adapted to illuminate indicator 35 when the voltage of battery 34 indicates that the battery 34 is no longer capable of operating the logic and control means for a pre-selected period of time felt to be a necessary minimum period for battery backup operation capability.

In the preferred embodiment, power supply 16 includes means for maintaining an exact "maintenance" voltage equal to the voltage of first output pair 38 (e.g. 9 volts DC) across battery 34 to maintain battery 34 at its desired voltage for an optimum period of time. This is a low amperage supply insufficient to "trickle charge" battery 34 from a run-down state. For this reason, in the preferred embodiment an alkaline type battery is used for battery 34 inasmuch as such batteries are manufactured to produce and maintain their output voltage within close tolerances. With the maintenance voltage applied across such a battery, the battery is maintained at its operating voltage for an optimum period of time. By contrast, normal "flashlight" type batteries produce an output voltage of much more lax tolerances. If such a battery is employed in the preferred embodiment of the present invention wherein the maintenance voltage is applied across the battery, such a battery will typically have greatly reduced life in its attempt to adjust its chemical balance to achieve the maintenance voltage being applied thereto.

Both the sensing and maintenance voltage circuits can be accomplished by techniques well known to those skilled in the art which techniques form no part of the present invention.

Figure 2:
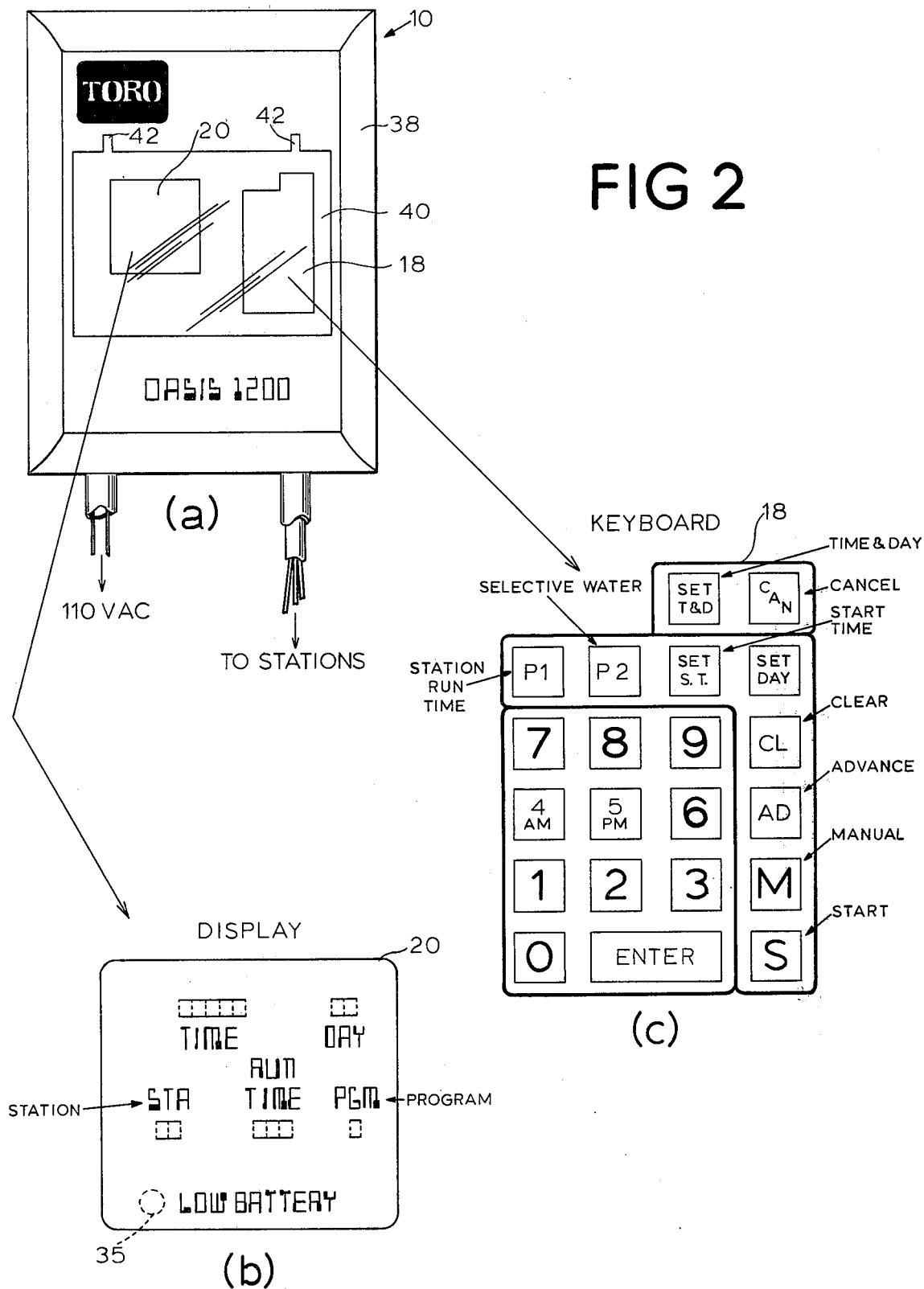
FIG. 2a, b, and c is a drawing of a tested embodiment of the controller of the present invention showing in detail the layout of the display board and keyboard employed therein for displaying irrigation information and entering irrigation information respectively.

Referring now to FIG. 2(a), a controller 10 according to the present invention is shown as manufactured and tested by the assignee of this application. In such apparatus, a controller 10 having twelve individually controlled outputs is housed within a housing 38 being approximately 7"×10"×3" in dimension. Thus, it can be seen that the apparatus of the present invention greatly reduces the size requirements over prior art mechanical type controllers. The housing 38 is provided with a transparent window 40 covering the display 20 and the keyboard 18. Window 40 is mounted on hinges 42 whereby window 40 can be lifted to provide access to keyboard 18. The specific details of display 20 and keyboard 18 are shown in views (b) and (c) of FIG. 2, respectively. These detailed views will be found to be particularly helpful in understanding the discussion of the operation of the logic and control means 12 which follows hereinafter.

Figure 3:
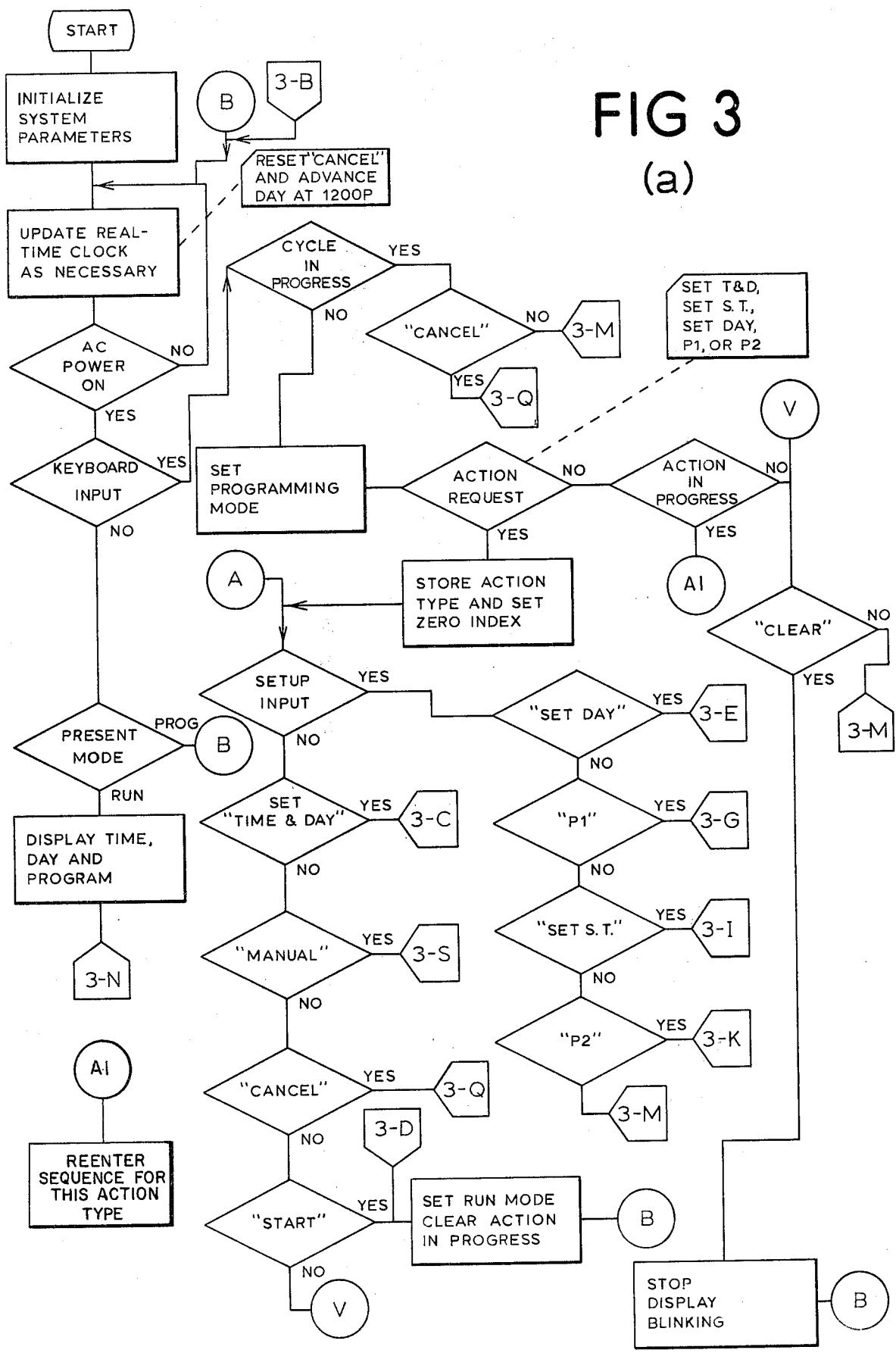
FIG. 3a–h is a flow diagram of the logic contained in the logic and control circuitry of the present invention for accomplishing both the entry of irrigation information for reprogramming and selective operation purposes as well as the logic to accomplish the run-time irrigation function.
Figure 3:
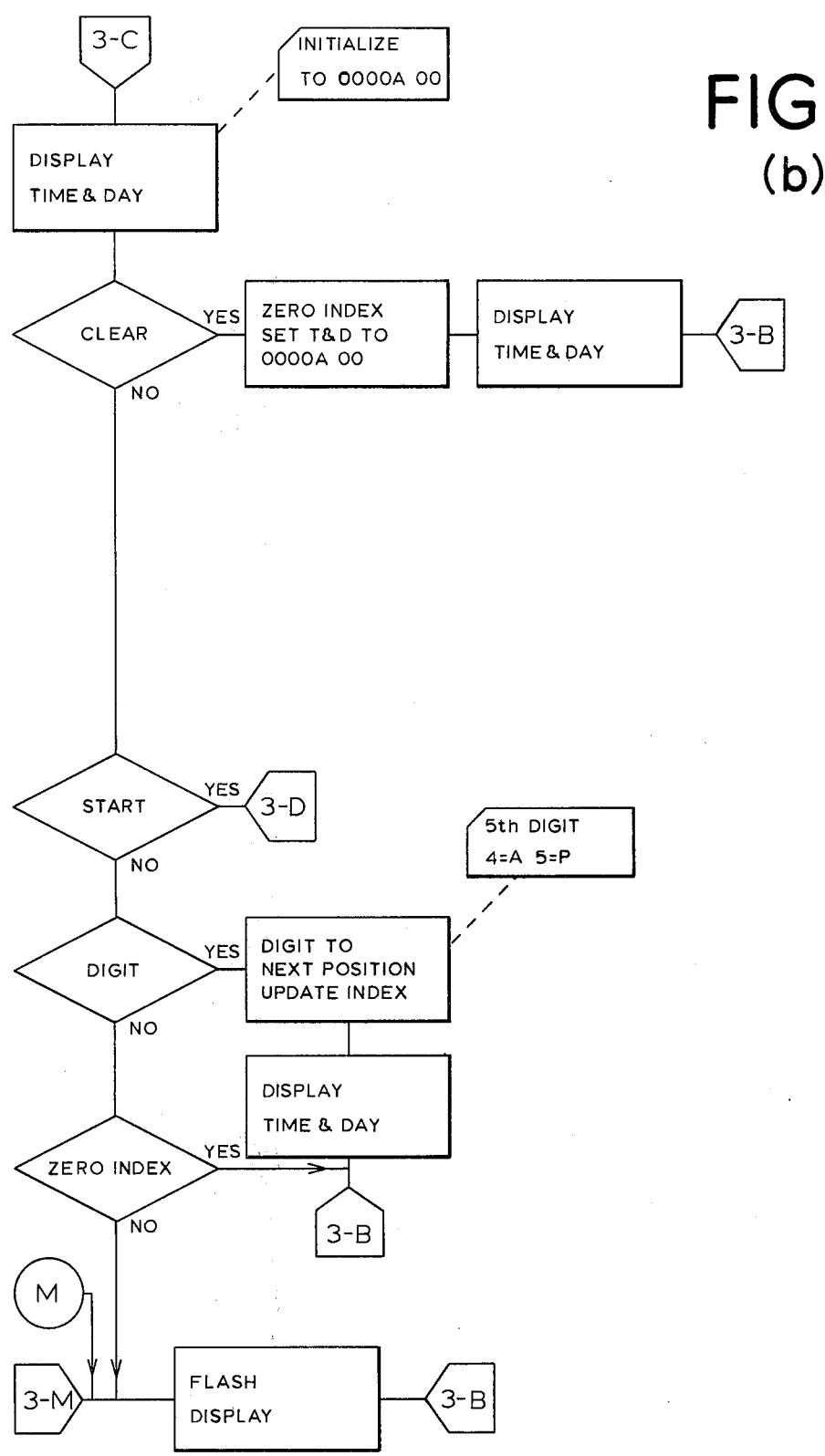
Figure 3:
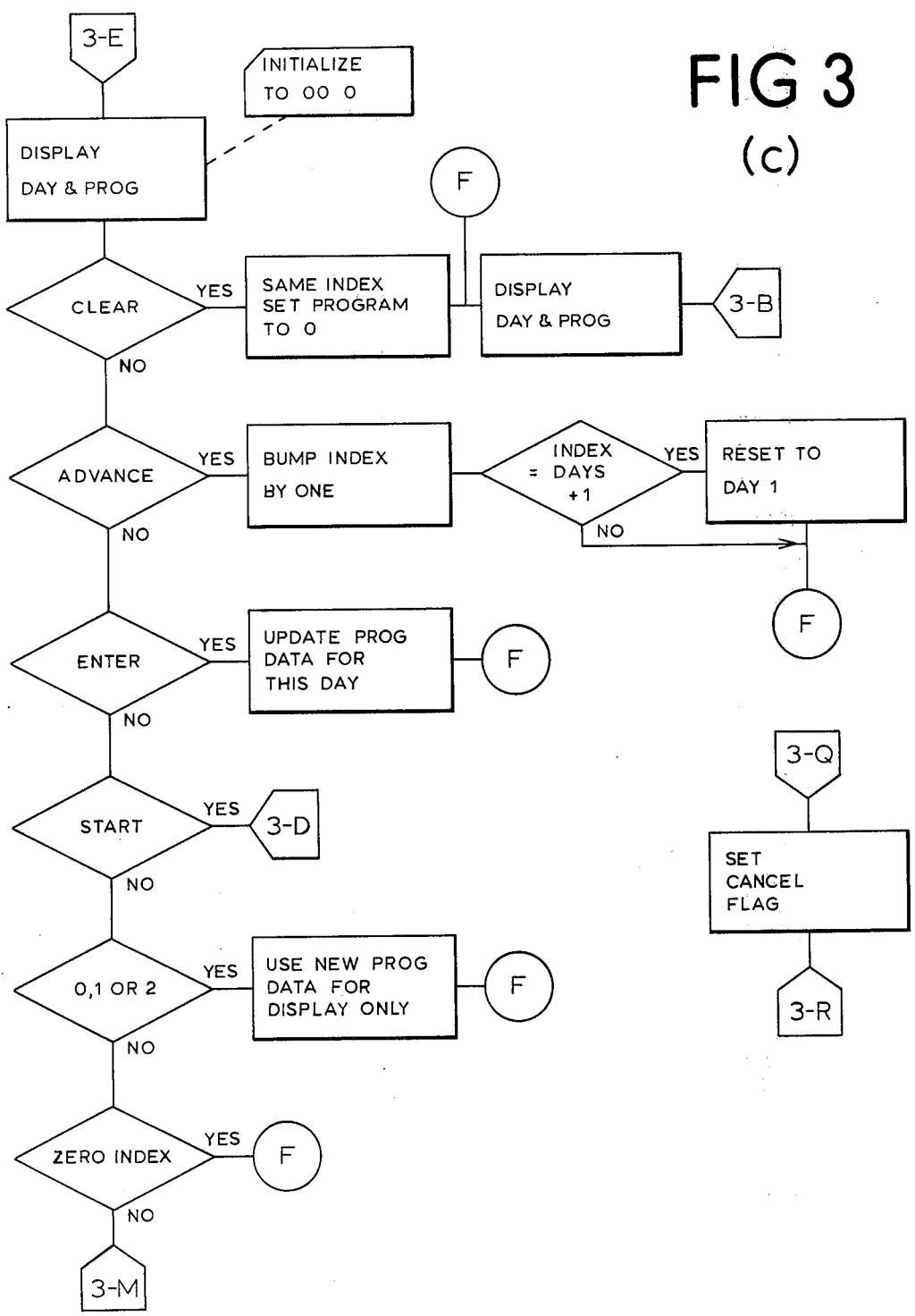
Figure 3:
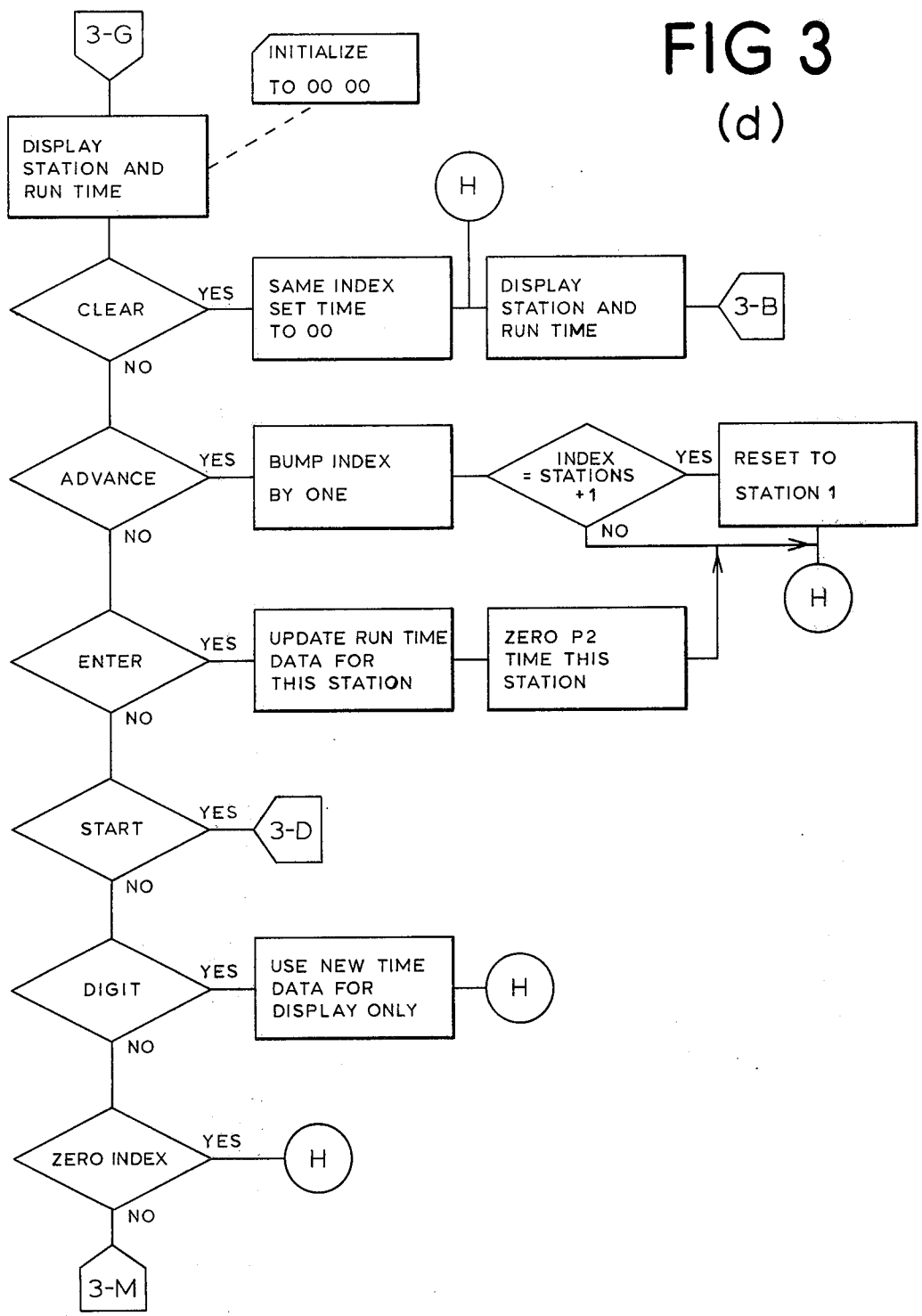
Figure 3:
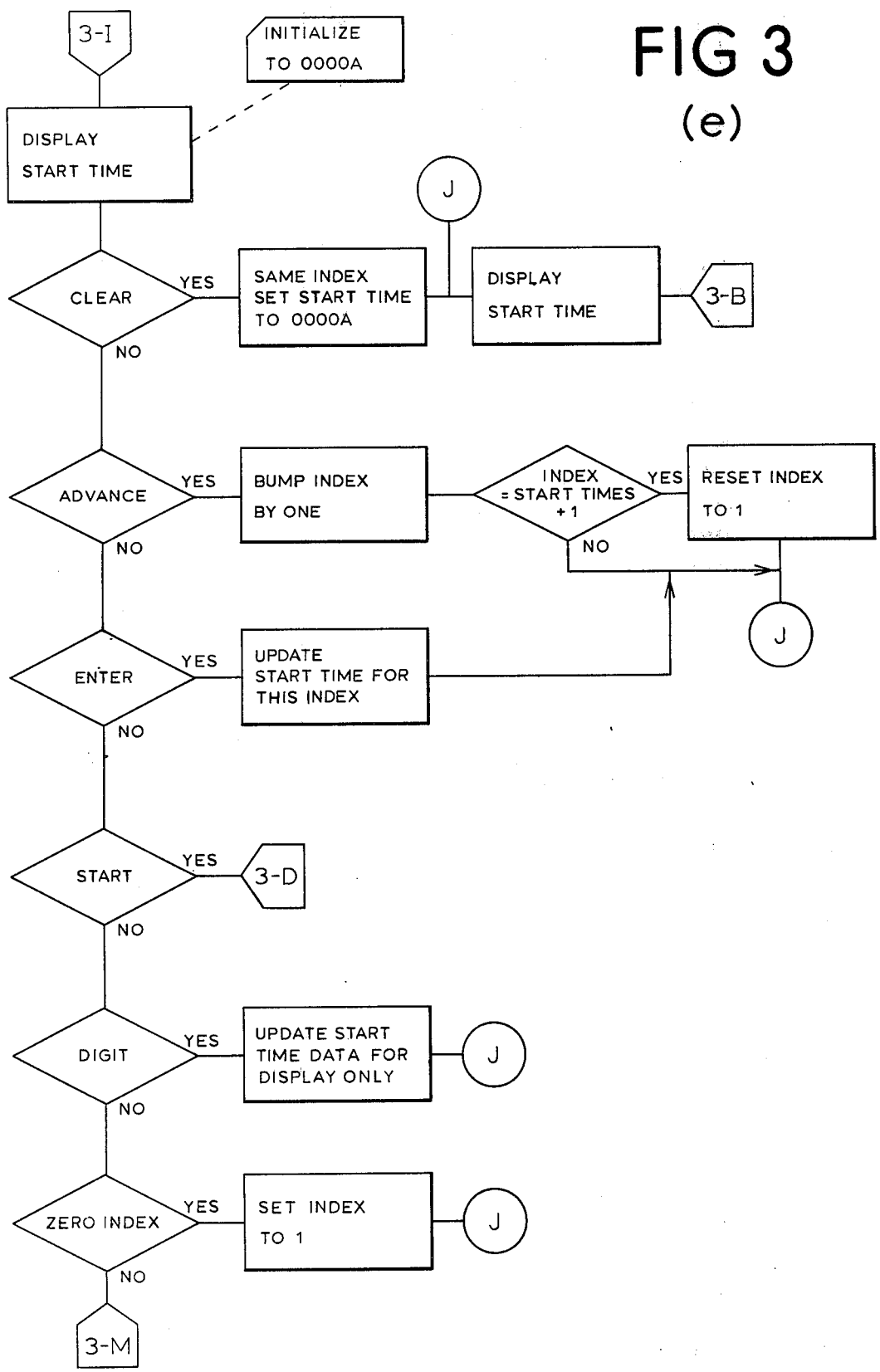
Figure 3:
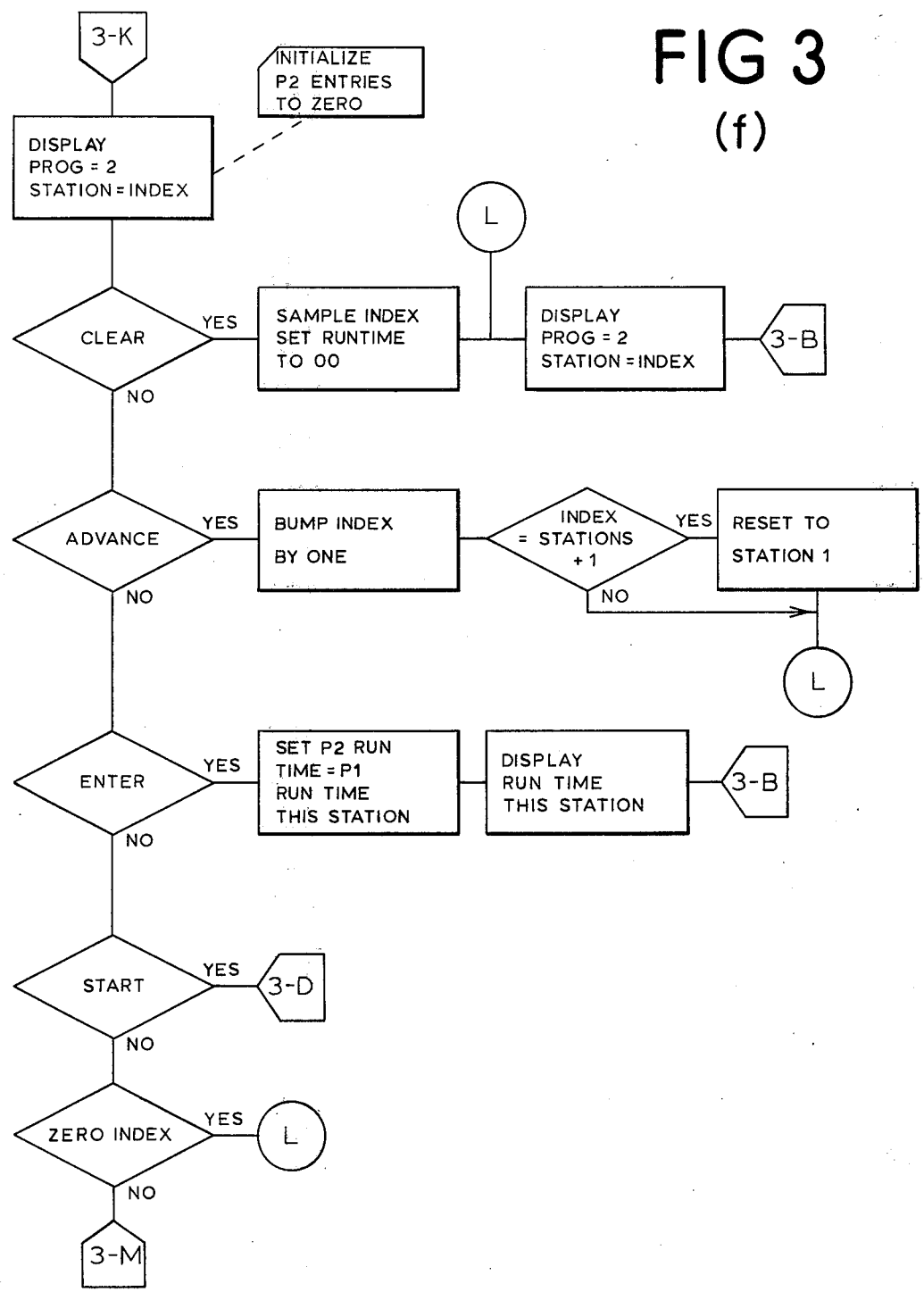
Figure 3:
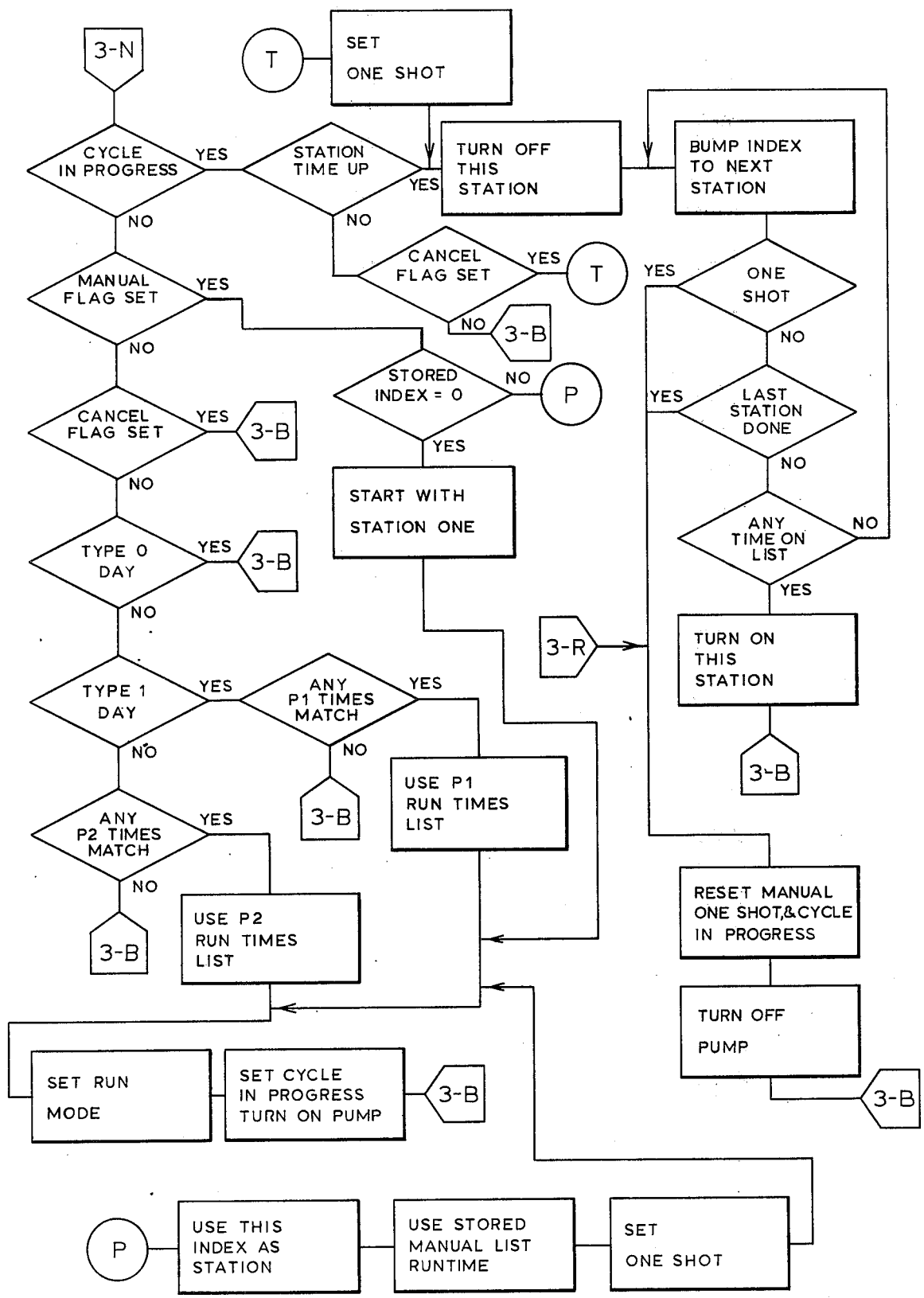
Figure 3:
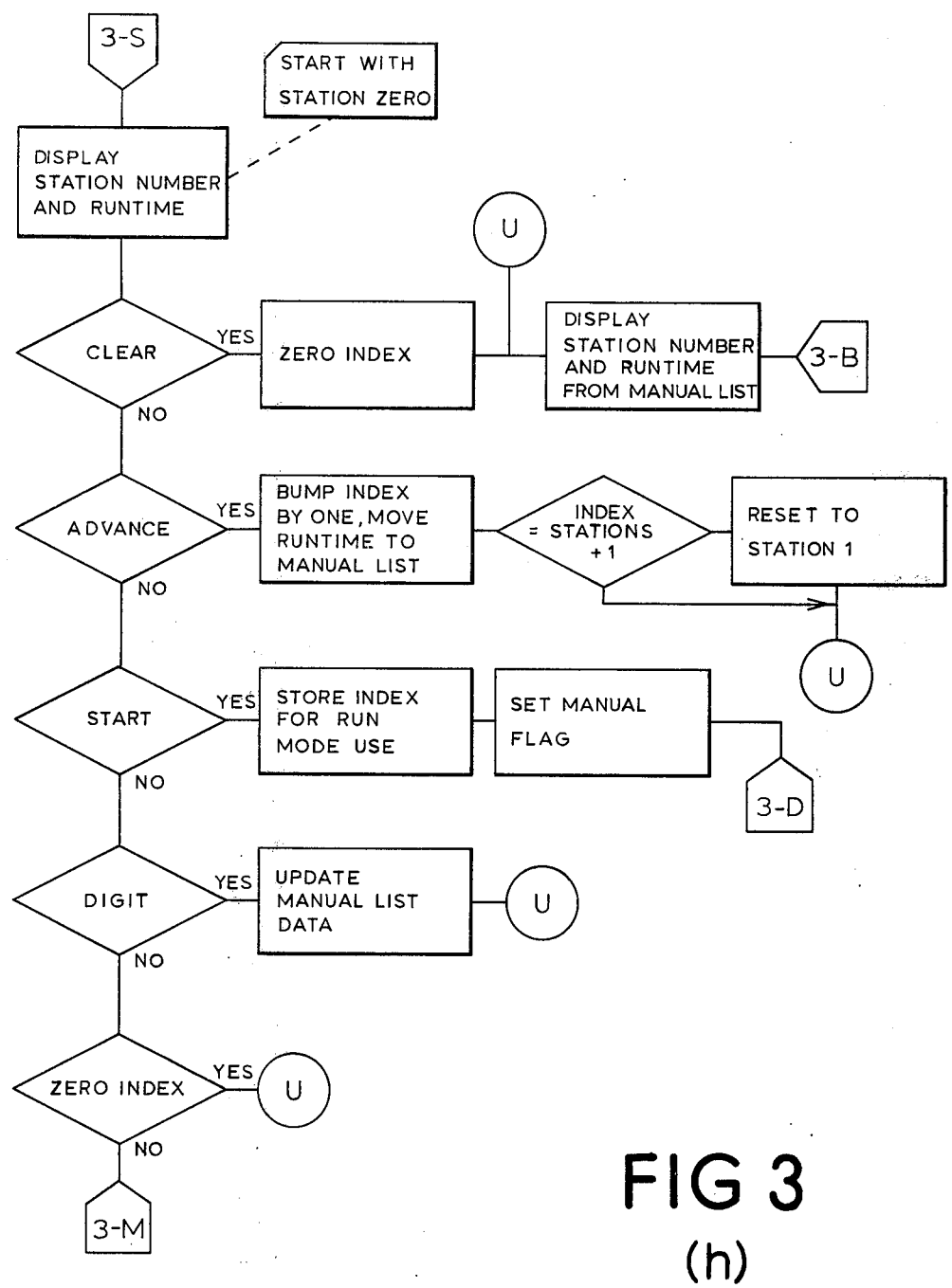

The logic sequence employed within logic and control means 12 of the preferred embodiment to accomplish the objectives of the present invention is shown in the logic flow diagram of FIG. 3. Referring first to FIG. 3(a), the main control loop of the logic sequence is shown. Upon initially applying power to controller 10, control is transferred to the logic sequence at the block marked "START". The logic sequence first calls for the initialization of the system parameters and storage areas within the RAM for the irrigation information as will be dictated by the particular mode of actual implementation (which is at the discretion of those skilled in the art and which forms no part of the present invention) and as set forth in the logic diagrams to be described hereinafter.

The main control loop begins (and always returns to) connector B. The first function of the main control loop is the updating of the real-time clock and associated data as necessary. This includes updating the memory locations indicating hour, day, etc. As indicated, in order to accomplish the automatic cancel reset function incorporated herein, the indicator employed to signify a cancel state should be reset as the day number is advanced by one at the hour of 1200A which corresponds to 12:00a.m. or midnight. The logic next checks to see if the AC power is connected. This is the data provided in conjunction with sensing line 30.

In the preferred embodiment, the logic is designed to accomplish three main tasks. The first task is the updating of the real-time clock and associated data just described. The second task is the generation of the output signals to the signal decoder 26 to control the various sprinkler stations 22. The third task is interfacing with the operator to input and/or update the data being used by the logic to accomplish the system functions. This includes such things as inputting the time and day as well as the specifics of the times and durations of sprinkler operation. In any system operating with various programs sharing common data, it is imperative that provision be made in some manner for the prevention of the pollution of data by simultaneous accesses by separate programs. In the present system, this is accomplished by having the real-time clock updating performed on a priority basis as compared to the second two tasks. The second two tasks are made mutually exclusive. That is, when the logic is in the "programming" mode interfacing with the operator through the keyboard 18, no output signals are produced by controller 10. On the other hand, when in the "run" mode and accomplishing an output cycle (cycle in progress) the logic performs no keyboard input functions except for a cancel request. The interaction of these three tasks will become apparent in the discussion that follows.

With reference once again to FIG. 3(a), following determination that the AC power is on, the logic sequence determines if a keyboard input has been made. If a keyboard input has been made and no output cycle is in progress, the logic is immediately put into the programming mode which locks out the run mode until such time as the programming mode has been terminated. If a cycle is in progress, the logic checks to see if the cancel (CAN) button has been depressed. If not, the display is blinked as a signal to the operator by branching to off-page connector 3-M. If a cancel request has been made, the programming mode path at off-page connector 3-Q is utilized to accomplish the request without setting the programming mode which causes the request to be handled immediately while remaining in the run mode. Having determined that a normal programming keyboard input has been made, the next determination that must be made is whether the keyboard input is an initiating action request. Action requests are made by depressing one of the following keys: SET T & D, SET S.T., SET DAY, P1, or P2. The particulars of each selection are discussed shortly hereinafter. If no action request is being initiated, the logic next determines if a previously started action request is in progress. In such case, the keyboard input is evaluated by proceeding to on-page connector A. If no action is in progress, the only further keyboard action allowed as legal is the depressing of the clear (CL) button which causes the blinking display (signifying an error condition to be discussed shortly) to be stopped and control to be transferred back to on-page connector B. If the clear (CL) button has not been depressed in this instance, the keyboard input is considered as a spurious input and control is transferred to the "keyboard error" path at off-page connector 3-M, which causes the display to be blinked and control to then return to connector B. In the preferred embodiment the display is blinked to indicate to an operator that an improper keyboard condition exists or that improper data was entered. This is a matter of choice in implementation and could as well be changed to other alternatives such as just ignoring the input.

If no keyboard input is present, the logic checks to see which of the tasks previously discussed the logic is presently accomplishing. The logic is always either in the "programming" mode or the "run" mode. If in the run mode, the time, day and program (PGM) are displayed in the appropriate locations of display 20 and transfer of the logic is given to off-page connector 3-N. For the moment, however, let us assume that the logic is in the programming mode to continue the discussion of the programming mode in conjunction with the keyboard input started above. If no keyboard input is present, control is transferred back to the beginning of the control loop at on-page connector B. The logic must not be allowed to loop in the programming mode waiting for an operator input as the real-time clock update task is the priority task, as previously stated, which must be accomplished. If a valid keyboard input either initiating an action request or continuing an action in progress is present, ultimate control transfer is given to on-page connector A.

The first determination made next is whether the action being requested or continuing in progress is of the "set up" type comprising—SET DAY, P1, SET S.T., or P2. To discuss the logic in its more likely sequence, let us assume that for the present the request was not a "set up" input. The logic next determines if this is a time and day request.

In the parameterization procedure followed by an operator, this would normally be the first request to be made. Assuming such is the case, control of the logic is transferred to off-page connector 3-C located within FIG. 3(b). This logic sequence is used by the operator to initially set the data within the RAM used in conjunction with clock logic 14 to maintain the real-time clock for the day and hour. The time and day are first displayed. In the preferred embodiment as shown, four digits are employed for the hour of the day proceeding from 1200 through 1159. This is followed by a single digit of A or P corresponding to a.m. and p.m. respectively. If desired, a military fashion 24 hour clock could be employed with four digits proceeding from 2400 to 2359. This is less familiar to the average person and is, therefore, not preferred. The day is shown as two digits. In the preferred embodiment shown, provision is made for fourteen individual days or two weeks. This could, of course, be made larger or smaller at option of the designer. Two weeks was felt to be an optimum period for possible unattended operation before operator intervention might be necessary. The day count proceeds from 01 to 14 and then back to 01 again. Day 00 is employed as the initialized condition showing no designation and, therefore, can be used throughout the logic as an indicator of an initial state. In the same fashion, a time of 0000 A being nonexistent in the defined environment, is used to indicate an initialized state of time being unassigned. Thus, as indicated in FIG. 3(b) in conjunction with the block labeled to indicate the display time and day action the time and day are initialized to the values of 0000A and 00 respectively.

The logic then checks for the pressing of keyboard buttons used within the logic itself. First, if the clear (CL) button has been pressed, the index is zeroed and the time and date are reinitialized to 0000A and 00 respectively, the updated time and day are displayed, and control is returned to the beginning of the control loop at off-page connector 3-B. Note once again that, recognizing the priority of the real-time clock rountine, control always returns to connector B to allow updating of the real-time clock data as necessary.

If the clear (CL) button has not been depressed, the start (S) button is next checked. The pressing of the start (S) button by the operator signifies the termination of the enter time and day function and returns control to off-page connector 3-D located within FIG. 3(a) which sets the run mode as the active mode and clears an "action in progress" indicator followed by the usual transfer of control to connector B. If neither the clear (CL) button nor the start (S) button have been depressed, the only valid input (unless the index is zero, indicating the action has just been requested) is a digit to be entered into the time or day. If the keyboard input is invalid, the display is blinked as previously mentioned employing the logic beginning at M. If a digit has been entered, the digit is input to the time and day numerical sequence in the next open position, the updated time and day are displayed, and control is given to off-page connector 3-B. Note, as indicated, that the digit positioning sequence must translate the fifth digit position to an A or a P upon the entry of a 4 or 5 at that position. That is, for purposes of entering times only, the 4 and 5 buttons serve a dual purpose of indicating AM and PM as well.

Having successfully initiated the controller as to the correct time and day, an operator would next program the irrigation information employing one of the four "set up" inputs passed over previously in this discussion. These four options will now be discussed in detail.

Upon depressing the SET DAY button, the operator causes the logic to transfer control to off-page connector 3-E located within FIG. 3(c). This logic sequence is used to set the watering or irrigation days. As previously mentioned, the preferred embodiment of the present invention is set up for a fourteen day program cycle. This logic sequence is used to set the watering days within the fourteen day programming cycle. The operator has a choice of three different watering programs—complete watering, selected stations to water, or no watering, whichever he prefers, for each of the fourteen days of the programming cycle. Upon entry to the logic sequence, the indexed day and program (PGM) type are displayed. As indicated, all entries are initialized to day 00 and program type 0. Since the initial index is also 0, the first display seen by the operator will be 000. Anytime the clear (CL) button is pushed, the logic sets the program (PGM) type for the indexed day to 0 as shown, displays the day and program (PGM) type in its new configuration, and transfers control to off-page connector 3-B. The operator sequences through the days seriatim by depressing the advance (AD) button which is the next item checked by the logic. Each time the advance (AD) button is depressed, the index is bumped by one. The index is then checked to see if it is equal to the number of days plus one. In the presently described embodiment, this test sequence would display a "yes" answer when the index equals fifteen. As previously described, upon reaching fifteen, the index is reset to day one so that the days continually cycle from 01 through 14 and back to 01 again (once day 00 has been left). Control is then transferred to on-page connector F which again causes the display of the day and program (PGM) type selection for that day. In this manner, the operator can sequence through the days to determine and/or verify the program (PGM) type assigned to each day without making any change.

The program logic following its test for depression of the advance (AD) button next checks to see if the ENTER button has been depressed. If it has, the data gathered to date for this day is inserted as the active program data for the day and control is transferred to on-page connector F. If the ENTER button has not been pushed but the START button has, this is next determined by the logic sequence and control is transferred to off-page connector 3-D to resume the run mode as previously described.

If the start (S) button has not been pushed, the logic next looks for entry of the three valid data designations 0, 1, or 2. These, of course, correspond to the previously described choices of "no watering", "complete watering," or "selected watering" respectively. That is, by entering a 0 for the program (PGM) status of a particular day, the operator indicates that no watering is to occur on that day. By entering a 1, he indicates that complete watering of all stations is to be accomplished and by entering a 2, he indicates that only selected stations are to be watered. If one of the designated numerals is entered, this data is used for displaying the day and program at on-page connector F and control is transferred to that point. Until the ENTER button is depressed, however, the data is not actually entered as active data. If none of the foregoing conditions is present, and the index is not 0 indicating the first pass-through following action initiation, transfer is made to the error connector 3-M.

The operator would next typically set the watering run times to be associated with the respective stations by depressing the P1 button. Upon depressing the P1 button, transfer is given to logic beginning at off-page connector 3-G located within FIG. 3(d). Each station used with the controller requires a run time which indicates how long each station will water. In the preferred embodiment, the run times are a minimum of one minute and a maximum of sixty minutes. This is a function of the system hardware and designer preference in combination and, of course, could be made otherwise. Any stations for which the run time remains at its initialized run time of 00 minutes will receive no watering. The logic associated with the set station watering run time function is quite similar to that associated with set day. The data for station (STA) and run time is initialized to 0000 as indicated. The station (STA) and run time is first displayed. This would begin with station 00 (corresponding to index zero which is always the first entry condition). If the clear (CL) button is depressed, the time is reset to 00 for that station, the station and run time are displayed, and control is transferred to off-page connector 3-B. Again, if advance (AD) is depressed, the index is increased by one and reset to station one when it equals the number of stations plus one. Upon depressing the ENTER button, the run time data gathered to date for this station is stored on a P1 list as the actual data to be used. Additionally, all the P2 times (to be discussed in greater detail hereinafter) associated with this station are zeroed and must be reinserted by a separate sequence.

Depressing the start (S) button as before causes transfer to be made to off-page connector 3-D to reinitiate the run mode. In this logic sequence, the entry of any digit causes that digit to be inserted into the data being gathered for that station and used for display purposes only until the enter button has been depressed. Again, unless the zero index condition is present, any other input causes transfer to be made to the error sequence at off-page connector 3-M.

The operator initializing his system would most likely next set the start times for the sprinkler system by depressing the SET S.T. button to cause transfer of the logic to off-page connector 3-R located within FIG. 3(e). In the preferred embodiment, six start times are available for watering. All or some may be used in the parameterization sequence. In the preferred embodiment, a list of six start times is maintained within the RAM which list is scanned each time a match against the current real-time hour clock is sought. This means two things. First, the start times need not be in sequence. Second, any time may be used as long as there is no overlap in the total station run time established in connection with the previously described procedure. That is, a start time of 1230P will be ineffective if a second start time of 1200P is also on the start time list and the total watering sequence is greater than 30 minutes. The specific reasoning for this will become apparent in the discussion of the run mode which follows hereinafter.

The set start time logic sequence underlying methodology again is similar to the previously discussed set-up type logic sequences. The entries of the start times table are initialized to the impossible time of 0000A. The logic sequence begins by displaying the first start time which, by now should be recognized, is that corresponding to the zero index position—which is the entry condition upon first entry to any action request logic sequence. If the clear (CL) button is depressed, the entry corresponding to the index is reinitialized to the 0000A configuration, the entry is displayed, and control returns to off-page connector 3-B. If the advance (AD) button is depressed, the index is increased by one and reset to one upon exceeding the maximum number of start times available. In the preferred embodiment, of course, this resetting would occur when the index was bumped to seven. Upon depressing the ENTER button, the data gathered to date for this index is inserted into the list as an actual start time to be employed. Upon depressing start (S), control is transferred to off-page connector 3-D to once again resume the run mode. If a digit is entered, the digit is inserted into the start time being gathered and used for display purposes only until the ENTER button is pushed as in the previously discussed logic sequences. In the event of a non-valid entry, control goes to the error logic path at off-page connector 3-M.

The preferred embodiment of the present invention includes a dual programming capability previously discussed wherein watering days can be designated as either type 0, type 1, or type 2 days corresponding to "no watering," "complete water," and "selected station watering" days. If the operator in setting his watering days has designated one or more days as selected station watering(2) days, he must designate the stations to be selectively watered by depressing the P2 button to transfer control to the logic sequence beginning at 3-K located in FIG. 3(f). Upon entry, the logic sequence sets the program (PGM) indicator on the display 20 to a 2 to indicate that the type 2 programs are being set. The station number (STA) is set equal to the index on the display. As noted, all the P2 entries are initialized to zero. The P1 list previously set up contains the station run times used when a type 1 day is in progress. The P2 list, in a similar manner, contains one entry for each station indicating the run time for that station each time an output sequence is initiated on a type 2 day. As with the previously described logic sequences, the clear (CL) and advance (AD) button depression logic is substantially identical as can be seen from the flow chart. If the ENTER button is found to be depressed in the logic sequence following the test of the clear (CL) and advance (AD) buttons, however, the action taken is somewhat different.

In the automatic mode of operation (a manual mode for overriding the automatic mode will be described hereinafter) the P2 times are either set equal to the P1 times or set to zero. There is no other choice. If a displayed station is to be included within the P2 list, depression of the ENTER button causes the station time on the P1 list to be transferred to the corresponding station entry point on the P2 list. The run time associated with the station is then displayed for operator verification and transfer is made to off-page connector 3-B to once again begin the control loop. If a different watering cycle run time is desired, the time on the P1 list must be changed. As will be remembered from the discussion of the logic relative to the P1 button hereinbefore, changing a station run time on the P1 list causes the corresponding entry on the P2 list to be zeroed. Thus, if upon seeing the displayed run time in the present logic sequence, the operator changes the corresponding P1 list time for the station, he must once again reestablish the P2 time by reexecuting this logic sequence. The balance of the logic sequence associated with the P2 button is according to the manner of the prior sequences as can be verified from the drawing.

The logic sequences described heretofore are used by an operator to parameterize the controller of the present invention to accomplish its automatic watering function. As discussed in the objectives of the present invention, however, it was desired to provide the capability of allowing the operator to selectively eliminate portions of the watering cycle or call for additional watering to take place without complicated techniques. These functions are accomplished by additional logic contained within the logic and control means 12 of the preferred embodiment of the present invention to be hereinafter described in detail.

Returning to the main control sequence logic of FIG. 3(a), following the two decision blocks "set up input" ? and "set time and day" ? discussed above, the logic sequence next checks to see if the manual (M) button has been depressed. If it has, control is transferred to the logic sequence beginning at off-page connector 3-S contained in FIG. 3(h). The manual option provides the operator with two additional capabilities. First, a complete watering cycle can be initiated. This is equivalent to adding a temporary start time to the start time list beginning immediately. As a second option, the operator can cause a selected station to be operated either for its normal run time or for a selected run time on a "one shot" basis. This is accomplished by maintaining a separate run time list for use in the manual mode. Any changes to the run time are made in this manual list and so are temporary for the period of manual operation only and normal run times are used in subsequent operation in the automatic mode. The logic sequence is entered in the usual manner with the index set to zero. Its first task is the display of the station (STA) number and run time which initially is 0000. The logic first checks to see if the clear (CL) button has been depressed. If it has, the index is returned to zero, the station number and run time from the manual list are displayed, and control returns in the usual manner to off-page connector 3-B. The logic next checks to see if the advance (AD) button has been depressed. If it has, the index is bumped by one and the run time from the automatic list is moved to the manual list. In the usual manner, when the index is bumped to a value equal to the number of stations plus one, it is reset to station one. Control is then transferred to connector U which displays the station (STA) number and run time from the manual list as described above. The logic sequence next checks to see if the start (S) button has been depressed. If it has, the index is stored for use by the run mode in a manner which will be discussed in greater detail hereinafter. A manual flag is set to indicate that the manual mode has been requested and control is transferred to off-page connector 3-D to resume the run mode. If neither the clear, advance, or start (S) button has been depressed, the logic next checks for a digit having been input. If it has, it is inserted into the proper digit position for the data being gathered in the manual list. That is, if the run time moved from the automatic mode list to the manual list is not the run time desired for this single operation of a single station, a new temporary run time can be inserted through the keyboard. If any other input than the above is made, except for the zero index condition, the usual error condition applies and control is transferred to off-page connector 3-M.

Returning once again to the main control sequence and FIG. 3(a), following the check for depression of the manual (M) button, the logic sequence next checks to see if the cancel (CAN) button has been depressed. If it has, control is transferred to the logic sequence at off-page connector 3-Q contained in FIG. 3(c). This sequence first sets a cancel flag and then transfers to the station shutdown sequence beginning at off-page connector 3-R contained within the run mode logic to be described hereinafter. It will be remembered that the cancel condition is reset by the real-time clock update routine located at connector B within FIG. 3(a) as previously discussed. Thus, the cancel mode is used to cancel the balance of a watering day only. In the event that extended shutdown for more than one day (excessive rain, etc.) is desired, the exclusiveness between the programming mode and run mode can be used to advantage. That is, by depressing an action request button, the manual (M) button, or the like so as to cause the logic sequence to enter the programming mode, the run mode; and accordingly, the outputs therefrom are terminated until such time as the logic is transferred from the programming mode back to the run mode. The real-time clock is, of course, maintained because of its priority status so that at any later time, be it a day, a week, or a month, the operator need merely depress the start (S) button to resume normal automatic operation at the proper moment in the pre-established time and day sequence.

Following its check for the cancel (CAN) button, the main logic path following on-page connector A within FIG. 3(a) next checks for depression of the start (S) button. The start (S) button always transfers control to the run mode by setting the run mode and clearing the action in progress indication followed by transferring control to on-page connector B.

If the start (S) button has not been pressed, the logic checks for the clear (CL) button. If the clear (CL) button has been depressed, the blinking of the display is stopped and transfer is made to on-page connector B. If the clear (CL) button has not been depressed, the logic sequence is in a programming error condition and control is transferred to off-page connector 3-M to cause the display to blink so that the operator can take appropriate corrective action.

Having thus described the logic of the programming mode of logic and control means 12 of controller 10 of the preferred embodiment, the logic associated with generating the output signals to control the sprinkler stations in the desired manner (run mode) can be discussed. In the logic sequence of FIG. 3(a), when the "present mode" is determined as the run mode, the logic displays the time, day, and program (PGM) type and transfers control to the run time logic path beginning at off-page connector 3-N located in FIG. 3(g). The run time logic is based around the basic task of periodically searching the start time lists to determine when it is time to begin an output cycle. Once a match has been found, the logic goes into a cycle in progress mode wherein the stations are operated in sequence for their indicated run time until the last station has been operated. No further time matches are sought during the time when a cycle is in progress. This is why the "overlapped" time entries mentioned earlier are ineffective. During the time when a cycle is in progress, only a cancel (CAN) request is effective to modify the sequence.

Thus, upon entry to the logic sequence at connector 3-N, the first decision block determines if a cycle is indeed in progress. If a cycle is in progress, the next determination is if the station presently in operation has completed its time of operation. The exact method of accomplishing this timekeeping function is a matter of choice in implementation and can be accomplished by any number of methods well-known to those skilled in the programming art which form no part of the present invention. When the logic determines that the run time has expired for the station presently in operation, that station is turned off and the index is bumped to the next station. As part of the manual sequence, the logic next checks to see if a "one shot" indication has been made. This corresponds to the manual mode wherein one station was started on a special basis for a one time additional watering sequence. If the one shot indication is present, the logic transfers to the later portion beginning with connector 3-R, which resets the manual mode, one shot, and cycle in progress states, turns off the pump (discussed later hereinafter) and transfers control to off-page connector 3-B. If this is not a one shot condition (the more usual case) the logic sequence checks to see if the last station has been done. If it has, control is transferred to the same shutdown sequence beginning at connector 3-R. If the last station has not been done, the appropriate run time list is accessed (P1, P2 or manual) and the time associated with this station is determined. If a zero time entry (no watering) is present for this station, the logic proceeds to the point previously discussed where the index is bumped to the next station. If there is time on the list for this station, the station is turned on. This means that an appropriate output command for the station for the particular hardware employed is sent to the signal decoder 26. This is, of course, a hardware dependent item easily implemented by one skilled in the art and, therefore, neither is, nor can be, addressed at this point. Returning to the "station time up" ? decision block, in the event that the time is not up, the logic checks to see if the cancel flag previously discussed in relation to the keyboard cancel (CAN) function has been set. If not, logic control is merely transferred to the beginning of the control loop at off-page connector 3-B. If the cancel flag has been set, the cycle in progress is terminated. This could be accomplished by a number of techniques. One method of convenience is shown wherein control is transferred to connector T which causes the one shot flag to be set and the logic sequence to be reentered as if the station time had elapsed. Thus, the station would be turned off, the index bumped to the next station, and the one shot indication "yes" path taken causing the termination of the output sequence to be entered at connector 3-R.

When the logic sequence beginning at 3-N finds that a cycle is not in progress, it first checks to see if the manual flag has been set by the keyboard sequence discussed hereinbefore. If the manual flag has been set, the logic looks at the index stored within the keyboard logic sequence. If the start (S) button within the keyboard sequence was depressed with the index equal to zero, the logic interprets this as an operator indication that a complete extra cycle of all stations having indicated run times is desired. Control is then transferred to a later point in the logic sequence wherein the cycle in progress condition is set and transfer is returned to the beginning of the control loop at off-page connector 3-B. If the manual flag is set and the stored index is not equal to zero, this is indicative of the operator selection of the "one shot" option. In this case, control is transferred to on-page connector P where the stored index is used as the station to be operated, the manual list run time is used for the "station time" determination, the one shot condition is established, and control is transferred to the later to be discussed logic sequence entered by the previously discussed manual path wherein the cycle in progress condition is set and control is transferred to the main control loop at off-page connector 3-B.

If there is no cycle in progress and the manual flag is not set, the logic sequence next checks to see if the cancel flag is set. If the cancel has been set, no time matches are checked until the cancel flag has been reset. Thus, with the cancel flag set, control is transferred to connector 3-B at the beginning of the control loop.

If the cancel flag is not set, the logic next checks to see if this is a type 0 day. It will be remembered that a type 0 day is one in which no watering occurs. Thus, in the manner of the cancel flag being set, if this is a type 0 day, control is transferred to the beginning of the control loop at off-page connector 3-B and no time matches are sought.

If none of the foregoing conditions have been met, the logic sequence next scans the start times list and compares the entries therein to the present hourly time of the real-time clock looking for a match. To do this, the logic first determines if it is a type 1 day. If it is not a type 1 day, it is assumed to be a type 2 day since only these three numbers (0, 1, and 2) are validly entered by the keyboard sequence. If a time match is made between the real-time clock and an entry on the start times list, the corresponding P1 or P2 run times list by station is provided for use by the previously described "station time up" ? decision block. The junction point common to the two manual flag paths previously discussed is then reached followed by the previously mentioned logic wherein the run mode is set and the cycle in progress condition is established. As part of this condition, the pump previously mentioned is turned on. In many instances, according to usage or local "codes", an auxiliary pump is necessary in the operation of large irrigation sprinkler systems. Wherefore, the controller of the present invention includes logic for turning on such a pump. The hardware portion of accomplishing this task can be done in the manner of optical isolators 28 in conjunction with TRIACs 30 used to control sprinkler stations 22. A pump relay need merely be substituted for a sprinkler station 22 and the associated optical isolator 28 driven by a separate line from computer 12 which is on anytime a sprinkler station is in operation.

Thus, it can be seen that the solid state controller apparatus of the present invention comprising solid state logic and control means, data input means, and a signal decoding and station power means is further limited by the logic sequence and associated data used thereby as including lists of operation durations and operation start times to be associated with each of the plurality of outputs and a matrix of a plurality of sequential days indicating the desired operational status of each of the plurality of outputs on each of the days. Moreover, each of the plurality of outputs is identified as being of a type 1, a type 2, or a type 3, the desired operational status identifies each day as a type 1 day, a type 2 day, or a type 3 day, and the logic and control means is adapted to make control signal outputs only to a type 2 and a type 3 output on a type 2 day and to a type 3 output on a type 3 day whereby individual outputs can be identified as inoperative and days can be identified as "no water," "partial water," and "full water" days. Additionally, the logic and control means is adapted by the foregoing logic to treat the balance of a particular day as a type 1 day without changing the day's normal type identification in response to a first override signal by an operator through the data input means and further adapted to restore a previously overridden day from type 1 status to its normal type status in response to a second override signal by an operator through the data input means.

Having thus described my invention in its entirety, I claim:

1. Improved automatic irrigation sprinkler system control apparatus comprising:
   (a) power supply means adapted to be connected to a source of A.C. power for providing a first voltage output pair for operating logic and display circuitry and a second voltage output pair for operating a sprinkler system valve;
   (b) at least one solid state switch having a power input, a power output, and control input, said power input being connected to one of said second voltage output pair;
   (c) at least one voltage isolator means for passing a signal having an electrically isolated input and output, said output being connected to said control input of said at least one solid state switch; and,
   (d) solid state control means having a power input connected to said first voltage output pair and a control signal output connected to said input of said at least one voltage isolator means for maintaining a real-time clock, continuously comparing the real-time clock value to preselected start times, and outputting control signals at said control signal output for preselected durations when ones of said preselected times equal the current real-time value whereby a sprinkler system valve can be connected between said power output and the other of said second voltage output pair and be controlled by said at least one solid state switch in response to signals at said control input.

2. The improved automatic irrigation sprinkler system control apparatus claimed in claim 1 and additionally comprising:
   (a) battery means connected to said power supply means for supplying said first voltage when said power supply means is not connected to the source of AC power; and,
   (b) means connected between said power supply and said control means for sensing when the AC power is disconnected from said power supply means and causing said control means to only maintain said real-time clock during periods when the AC power is disconnected.

3. The improved automatic irrigation sprinkler system control apparatus claimed in claim 2 and additionally comprising:
   means connected to said battery means for sensing the voltage level of said battery and for indicating when said battery is no longer capable of operating said control means for a pre-selected period of time.

4. The improved automatic irrigation sprinkler system control apparatus claimed in claim 3 wherein:
   said battery sensing means includes means for applying said first voltage at low amperage across said battery when said AC power is connected whereby said battery is not recharged if discharged but maintained at said first voltage level for the maximum possible time.

5. The improved automatic irrigation sprinkler system control apparatus claimed in claim 1 and additionally comprising:
   means connected to said control means for changing said preselected time comparison values and said preselected durations of said control signals being output therapy.

6. The improved automatic irrigation sprinkler system control apparatus claimed in claim 5 wherein:
   said changing means includes a keyboard having a plurality of manually operated switches for specifying data values to be input to said control means.

7. The improved automatic irrigation sprinkler system control apparatus claimed in claim 6 and additionally comprising:
   display means connected to said control means for displaying the present preselected time and duration values being used by said control means to output said control signals.

8. The improved automatic irrigation sprinkler system control apparatus claimed in claim 6 wherein:
   said control means includes logic means for outputting an additional non-preselected output signal for an individually selectable time in response to an input from said keyboard without changing said preselected times and durations.

9. In automatic irrigation sprinkler systems wherein a plurality of sprinkler stations are controlled by electrical signals from a controller, solid state controller apparatus comprising:
   (a) solid state logic and control means including means for storing irrigation information which includes data value lists of operation durations and operation start times to be associated with each of a plurality of outputs and a days by outputs/status matrix of data values defining the desired operational status of each of said plurality of outputs on each of a plurality of sequential days and having a data input and a control signal output for generating control signals identified with particular sprinkler stations as a function of said irrigation information;
   (b) data input means connected to said data input for allowing an operator to input irrigation information and override signals into said solid state logic and control means; and,
   (c) signal decoding and station power means having an input connected to said control signal output and a plurality of outputs to which individual sprinkler stations can be connected for receiving said sprinkler identified control signals and outputting a voltage at said output to which the sprinkler station identified with said control signal is connected, whereby the sprinkler station is turned on in response to an associated control signal from said logic and control means.

10. The sprinkler system controller apparatus claimed in claim 9 wherein:

(a) each of said plurality of outputs is identified as being a type 1 output, a type 2 output, or a type 3 output;

(b) said desired operational status identifies each day as a type 1 day, a type 2 day, or a type 3 day;

(c) said logic and control means is adapted to make control signal outputs only to a type 2 and a type 3 output on a type 2 day and to a type 3 output on a type 3 day whereby individual outputs can be identified as inoperative and days can be identified as "no water," "partial water," and "full water" days.

11. The sprinkler system controller apparatus claimed in claim 10 wherein:

said logic and control means is adapted to treat the balance of a particular day as a type 1 day without changing the day's normal type identification in response to a first override signal by an operator through said data input means.

12. The sprinkler system controller apparatus claimed in claim 11 wherein:

said logic and control means is adapted to restore a previously overriden day from type 1 status to its normal type status in response to a second override signal by an operator through said data input means.

13. In automatic irrigation sprinkler systems wherein a plurality of sprinkler stations are controlled by electrical signals from a controller, solid state controller apparatus comprising:

(a) solid state logic and control means including means for storing irrigation information which includes data value lists of operation durations and operation start times to be associated with each of a plurality of outputs and a days by outputs/status matrix of data values defining the desired operational status of each of said plurality of outputs on each of a plurality of sequential days and having a data input and control signal output for generating control signals identified with particular sprinkler stations as a function of said irrigation information, said solid state logic and control means further including means for performing logic comprising a first task of maintaining a current real-time clock, a second task of generating output signals as a function of coincidence between the current state of said real-time clock and said irrigation information, and a third task of interfacing with an operator to update said real-time clock and said irrigation information from data values input through a data input means, said logic and control means being further adapted to not perform said third task when in the process of performing said second and to subordinate said second task and said third task to the performance of said first task whereby data common to said first, second and third task is not polluted by multiple simultaneous accesses;

(b) data input means connected to said data input for allowing an operator to input irrigation information and override signals into said solid state logic and control means; and, (c) signal decoding and station power means having an input connected to said control signal output and a plurality of outputs to which individual sprinkler stations can be connected for receiving said sprinkler identified control signals and outputting a voltage at said output to which the sprinkler station identified with said control signal is connected whereby the sprinkler station is turned on in response to an associated control signal from said logic and control means.

14. The sprinkler system controller apparatus claimed in claim 13 wherein:

said signal decoding and station power means contains a battery backup power supply and said logic and control means is adapted to be locked into said first task whenever said backup power is the only power to said controller.

* * * * *